United States Patent
Watanabe et al.

(10) Patent No.: US 6,208,438 B1
(45) Date of Patent: Mar. 27, 2001

(54) REFLECTION TYPE IMAGE READER HAVING AN ORIGINAL POSITIONING SHEET

(75) Inventors: Hitoshi Watanabe; Hiroshi Hanzawa, both of Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/075,332

(22) Filed: May 11, 1998

(30) Foreign Application Priority Data

May 20, 1997 (JP) .................................................... 9-145834

(51) Int. Cl.$^7$ ...................................................... H04N 1/04
(52) U.S. Cl. ......................... 358/488; 358/406; 358/497; 355/75; 399/211
(58) Field of Search ...................................... 358/487, 506, 358/406, 504, 488, 401, 501, 474, 497; 355/75, 79; 399/211; 382/312

(56) References Cited

U.S. PATENT DOCUMENTS

| | | |
|---|---|---|
| 4,595,285 | 6/1986 | Miwa et al. . |
| 4,707,117 | 11/1987 | Takenaka et al. . |
| 4,835,618 | 5/1989 | Shimizu . |
| 4,897,689 | * 1/1990 | De Keyzer et al. .................. 355/79 |
| 4,942,621 | 7/1990 | Angwin . |
| 5,012,353 | * 4/1991 | Yoshino et al. ....................... 358/401 |
| 5,625,469 | * 4/1997 | Wheeler et al. ...................... 358/487 |

FOREIGN PATENT DOCUMENTS

| | | |
|---|---|---|
| 195 27 169 C1 | 11/1996 | (DE) . |
| 59-165044 | 9/1984 | (JP) . |
| 61-295545 | 12/1986 | (JP) . |
| 3-13932 | 1/1991 | (JP) . |
| 4-324751 | 11/1992 | (JP) . |
| 5-110783 | 4/1993 | (JP) . |
| 7-43841 | 2/1995 | (JP) . |
| 7-273948 | 10/1995 | (JP) . |
| 8-278574 | 10/1996 | (JP) . |

* cited by examiner

Primary Examiner—Cheukfan Lee
(74) Attorney, Agent, or Firm—Oliff & Berridge, PLC

(57) ABSTRACT

In a reflection type image reader having a stage glass on which an original is placed with its image facing downward to be read out by a photoelectric image reading head from the lower side so as to be converted into an electric signal, in order to make it, easy to position the original relative to the stage glass, an original positioning sheet, bearing an original positioning reference mark is placed on the stage glass in a fixed positional relationship thereto, with the original being placed between the stage glass and the original positioning sheet with its image facing downward, while a light source for original positioning is provided below the stage glass to illuminate the original from its front side, so that the image observable by the light passed through the original is referred to against the reference mark of the original positioning sheet.

15 Claims, 10 Drawing Sheets

REFLECTION TYPE IMAGE READER HAVING AN ORIGINAL POSITIONING SHEET

BACKGROUND OF THE INVENTION

1. Field of the Invention

The present invention relates to the art of copying and printing machines, and more particularly, to an image reader in this art for photoelectrically reading out an image of an original to generate a corresponding electric signal.

2. Description of the Prior Art

There has been long known and widely used such an image reader that has a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a light source means for projecting light beams to the original placed on the stage glass from a lower side thereof therethrough and a photoelectric converting means for receiving and converting light beams reflected from the original into an electric signal corresponding to the image.

With regard to such a reflection type image reader, it has been proposed by Japanese Patent Laid-open Publication Sho 59-165044 to provide illumination means below the four corners of the stage glass to facilitate an action of confirming the position of an original placed on the stage glass prior to the reading out thereof in apprehension of the original being displaced as a result of pressing by the press plate, as it often occurs when an open page of a book is the original to be read out. Further, it has been proposed by Japanese Patent Laid-open Publication Sho 61-295549 to operate a scanning type image reading head for about two times of scanning reciprocation with an actuation of only the illumination means thereof in response to a pressing of a switch for confirming the position of the original so that an action of confirming the position of the original under an illumination is available in the meantime. Still further, it has been proposed by Japanese Patent Laid-open Publication Hei 3-13932 to draw some reference marks for positioning originals such as frames by lines showing the contours of several regular sheet sizes on the stage glass with a fluorescent material observable by human eyes but not responded by the photoelectric image reading head, in addition to a provision of the illumination means below the stage glass for confirming the positions of originals.

When the reference marks for positioning originals such as the frames by lines are provided in the stage glass as proposed in the above-mentioned Publication Hei 3-13932, the reference marks must be such that are observable by human eyes but not responded by the photoelectric image reading head as described above. Still further, when the reference marks are such frames of lines showing the regular sizes of sheets, although a coincidence of a peripheral edge of an original with a frame of line is directly observable as looked down from above when the original is a sheet of a regular size, if an image, not a peripheral edge, of an original is to be positioned relative to the stage glass at a particular positional or directional relationship, the reference marks provided in the stage glass are not directly observable from above as they are covered by the original. Therefore, even when an illumination means is provided under the stage glass, the reference marks in such a thickness as to be not responded by the photoelectric image reading head will not be clearly observable from above through the original.

SUMMARY OF THE INVENTION

In view of the above restrictions of the art of providing the original positioning reference marks for assisting the positioning of an original relative to the stage glass on the stage glass itself, it is a primary object of the present invention to provide a reflection type image reader having a novel original positioning reference mark free of such restrictions.

In order to accomplish the above-mentioned object, the present invention proposes an image reader comprising a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a first light source means for projecting light beams to the original placed on the stage glass from a lower side thereof therethrough and a photoelectric converting means for receiving and converting light beams reflected from the original into an electric signal corresponding to the image, a substantially transparent original positioning sheet optionally mounted over the stage glass in a predetermined positional relationship thereto, the original positioning sheet bearing an original positioning reference mark, and a second light source means for projecting light beams to the original placed on the stage glass from the lower side thereof therethrough and the original positioning sheet placed thereon when the original is placed between the stage glass and the original positioning sheet mounted thereover.

When the stage glass is illuminated from the lower side thereof by the second light source means as described above, even when an original is placed on the stage glass with its surface bearing an image facing downward, if the original is not a page of an open book or a particularly thick sheet but an ordinary paper sheet, the image of the original is clearly observable through the original from above, i.e. from the back thereof. Therefore, when a substantially transparent original positioning sheet bearing an original positioning reference mark is prepared, so as to be optionally mounted over the stage glass in a predetermined positional relationship thereto, an original placed on the stage glass as sandwiched between the original positioning sheet and the stage glass allows an operator to position the original relative to the reference mark of the original positioning sheet laid over the original by confirming an image of the original observable through the original illuminated from the lower side thereof, so that any optional part of the image of the original is readily precisely positioned relative to the stage glass. When such a positioning operation has been finished, then leaving the original positioning sheet as held in the position, the press plate may be laid over the original positioning sheet, and the photoelectric image reading head may be operated to execute the reading out of the original.

Since the original positioning reference mark provided in the original positioning sheet is positioned on the back of the original relative to the photoelectric image reading head, in the reflection type original reading in which light beams are projected to the front surface of the original and the original is read out by the light beams reflected at the front surface of the original, the read out image is not disturbed by the original positioning reference mark as long as the original is a normal white opaque sheet.

To be adaptable to a case that the original is a transparent or semi-transparent sheet, the original positioning reference mark may be made of a fine line drawn in a color observable by human eyes from an upper side of the original positioning sheet, with a band layer of a white painting material provided on a lower surface of the original positioning sheet to extend along the color line, or the original positioning reference mark may be drawn by a fluorescent material observable by human eyes but not detectable by the photoelectric image reading head.

According to an embodiment of the present invention, the stage glass and the original positioning sheet may each be of a rectangular contour, and the original positioning sheet may be removably mounted at a portion thereof extending along an edge of the rectangular contour thereof to either the stage glass or the casing along an edge of the rectangular contour of the stage glass.

According to another embodiment of the present invention, the original positioning sheet may be wound up about a core rod arranged along an edge of the rectangular contour of the stage glass in parallel thereto in a housed condition thereof, so as to be unwound therefrom to extend over the stage glass when used.

According to the present invention, the image of the original and the original positioning reference mark are apart from one another at least for the thickness of the original, while the light beams are projected from the lower side of the stage glass. Therefore, it is desirable that the light beams are projected to the stage glass to be as close to vertical thereto as possible. In view of this, as an embodiment of the present invention, the photoelectric image reading head is of a scanning type to move along the stage glass therebelow in reading out the image of the original, and it is when the image reading head is at a rest position of a scanning movement thereof that the second light source means is powered to emit the light beams, with a reflecting board for reflecting the light beams from the second light source means toward an exposure area of the stage glass.

Further, the image reading head may be made movable to a retreat position from a rest position of a scanning movement thereof to be out of an exposure area of the stage glass, and it is when the image reading head is at the retreat position that the second light source means is powered to emit, the light beams, with a reflecting board for reflecting the light beams from the second light source means toward the exposure area of the stage glass, so that a more uniform illumination is available over the entire region thereof.

As a preferred embodiment, the reflecting board is made of a plane board having a surface which scatters light beams, the reflecting board being positioned at a bottom portion of an inner space of the casing to oppose the stage glass, with the light beams emitted from the second light source means being projected toward the surface of the reflecting board.

According to a further preferred embodiment, the reflecting board is made to be of a movable type adapted to be positioned at a retreat position thereof not to interfere with the scanning movement of the image reading head when the image reading head is scanning, and biased from the retreat position so as to more uniformly reflect the light beams from the second light source means when the image reading head is at the rest or retreat position.

According to a further embodiment, the second light source means is made to include an elongated lamp extending in a direction perpendicular to a direction of scanning movement of the image reading head, so as to illuminate the entire region of the exposure area of the stage glass with a reflecting board when the image reading head is positioned at the rest or retreat position along an edge of the stage glass.

Further, the second light source means may be provided by a lamp of the first light source means being controlled of lightening thereof in a manner different from a manner of the lamp being controlled for providing the first light source means, and the image reading head may be movable to and stopped at any optional position of a scanning movement thereof according to a manual control, with the lamp being so controlled as to provide the second light source means.

BRIEF DESCRIPTION OF THE DRAWINGS

In the accompanying drawings.

DESCRIPTION OF THE PREFERRED EMBODIMENTS

In the following, the invention will be described in more detail with respect to the embodiments thereof with reference to the accompanying drawings.

Figure 1:
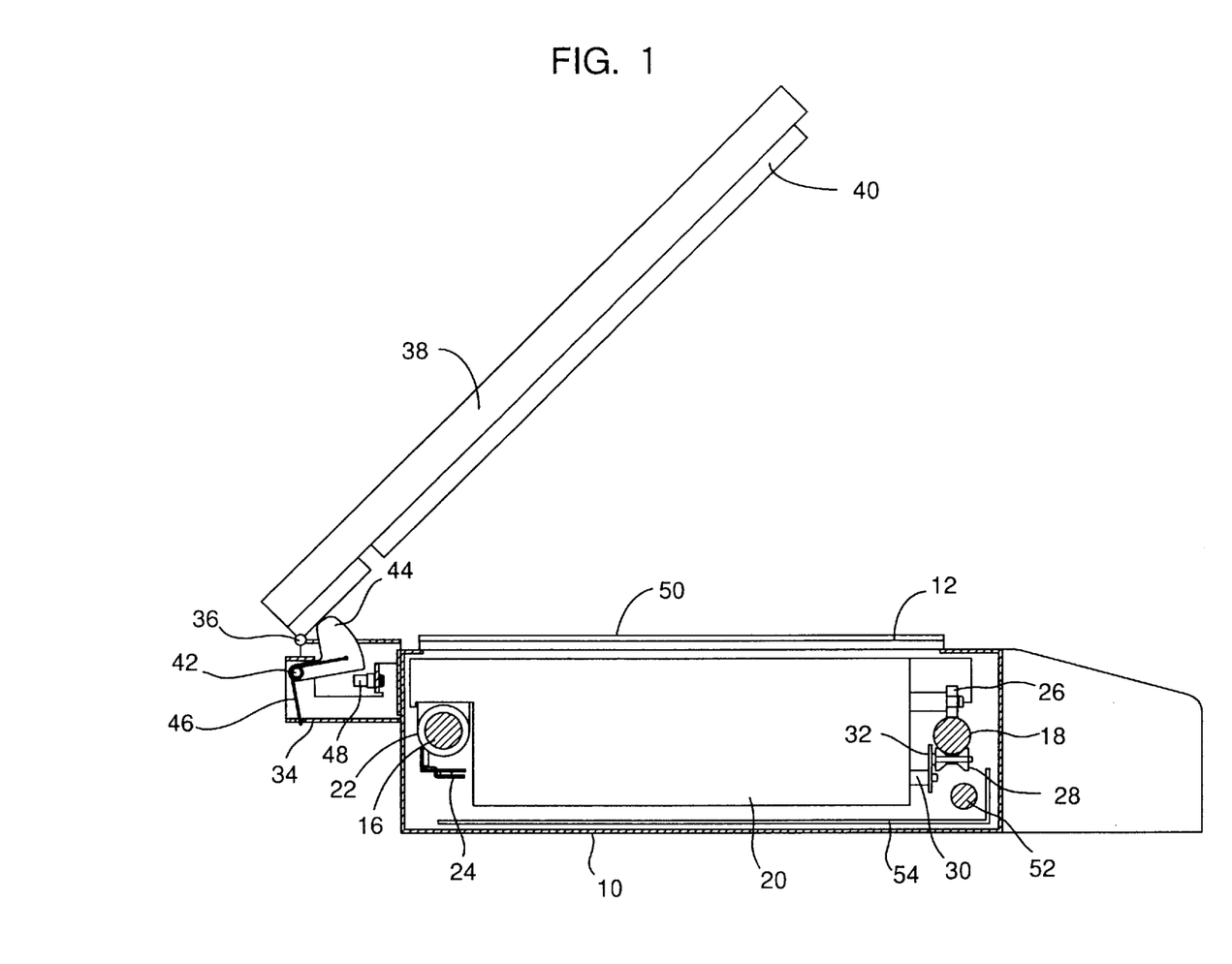
FIG. 1 is a somewhat diagrammatical partly sectional side views of an embodiment of the reflection type image reader according to the present invention.
Figure 2:
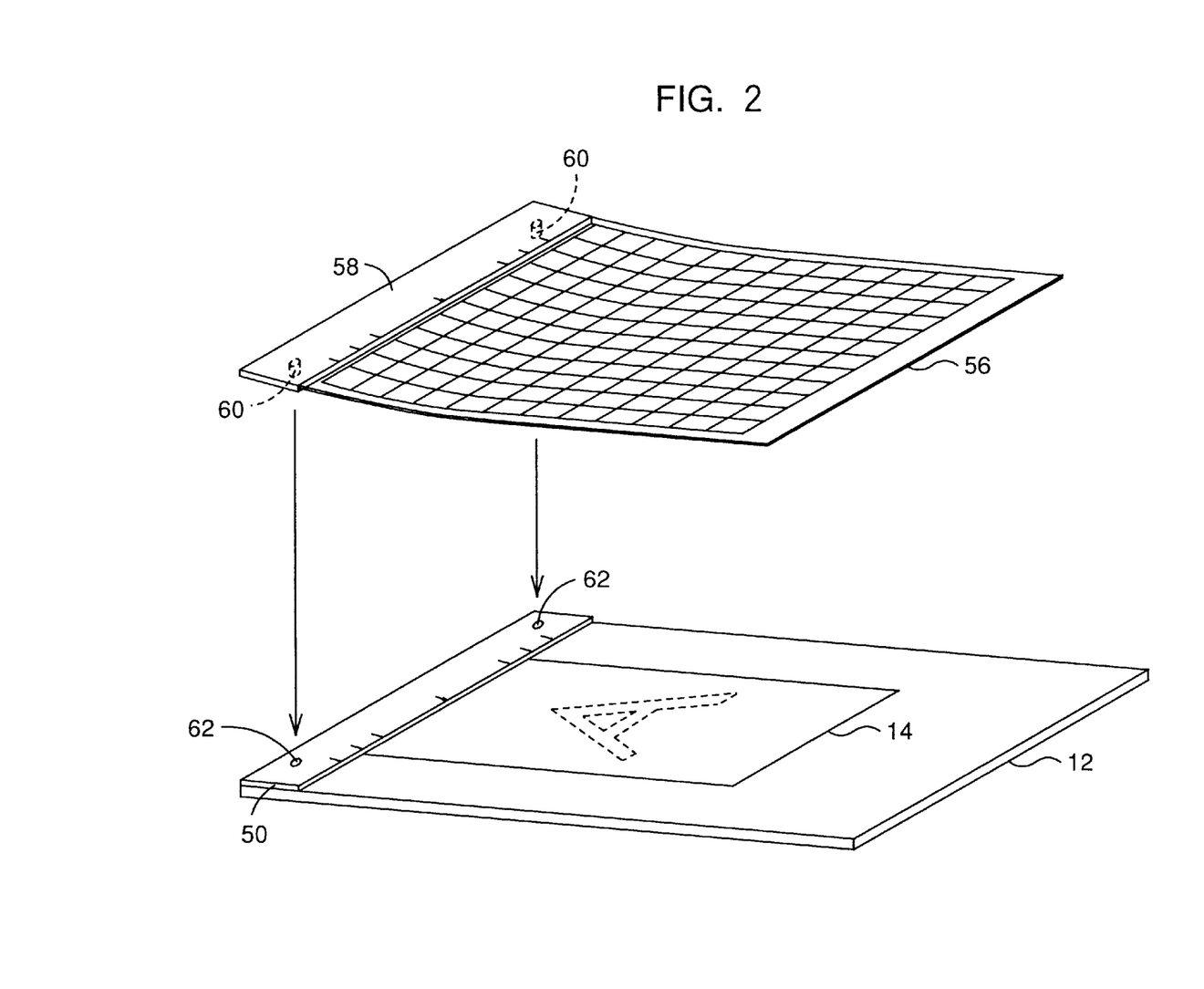
FIG. 2 is a perspective view showing the stage glass taken out from the image reader of FIG. 1, with an embodiment of the original positioning sheet for use therewith.

FIG. 1 is a somewhat diagrammatical side view of an embodiment of the image reader according to the present invention, showing the image reader with an original positioning sheet having been removed therefrom, and FIG. 2 is a perspective view of the stage glass of the image reader shown in FIG. 1 and an embodiment of the original positioning sheet adapted to be optionally mounted to the stage glass. In these figures, a box type casing 10 of the image reader supports a stage glass 12 of a rectangular contour mounted thereon, so that an original 14 placed on the stage glass with its image facing downward is read out by a photoelectric image reading head 20 guided by a pair of guide rods 16 and 18 to be able to reciprocate therealong in the casing. The image reading head 20 is of a known construction elongated in the transverse direction as viewed in the figure, incorporating therein an optical means composed of a fluorescent lamp, a lens, a mirror, etc. (all not shown) elongated in the longitudinal direction thereof, an array of CCD arranged in the longitudinal direction thereof, etc., and adapted to be moved in an auxiliary scanning direction perpendicular to the paper sheet of the drawing along the guide rods 16 and 18, while reading out digitally an original placed on the stage glass 12, so as to covert a two dimensional image into a series of electric signals. Since it is a known art to convert an image of an original into an electric signal by a scanning movement of this kind of photoelectric image reading head, and since such a function is not directly concerned with the gist of the present invention, no further detailed descriptions of the internal construction of the image reading head will be omitted. In this connection, in the construction shown in FIG. 1, 22 is a support lug for the image reading head 20, the support lug having a hole for receiving the guide rod 16; 24 is an endless belt engaged with the support lug for driving the image reading head 20 along the guide rod 16; 26 is a roller adapted to rotate along the guide rod 18 thereover, while supporting the image reading head 20; and 28 is a bobbin-shaped roller engaging the guide rod 18 from the lower side thereof, said roller being rotatably supported at one end of a lever 32 which is pivotably mounted to the image reading head 20 at another end thereof by a shaft 30, said lever being biased by a spring not, shown in the figure around the pivotal mounting thereof to the image reading head, so as to press the roller 28 against the guide rod 18, thereby providing a construction that the guide rod 18 is elastically held between the rollers 26 and 28.

A press plate 38 is pivotably mounted to the casing 10 at a box-shaped projection 34 formed at a part of the casing by a pivot shaft 36. The press plate 38 is provided with an elastic pad 40 made of an elastic foamed resin al a lower surface thereof, and is adapted to press and hold an original placed on the stage glass when it is read out. The press plate 38 is normally sprung up to its open position such as shown in the figure, by the spring force of a clip spring 46, via a lever member 44 pivotably mounted to the box-shaped projection 34 with a pivot shaft 42, said lever member being biased in the counter-clockwise rotational direction in the figure by the clip spring 46. 48 is a photo sensor adapted to dispatch a signal when the press plate 38 was closed onto the stage glass 12, by detecting a corresponding movement of the lever member 44.

On the stage glass 12 there is mounted a band member 50 along an edge of the rectangular contour of the stage glass, the edge being on this slide of the stage glass as viewed in FIG. 1. The band member 50 is a thin member having a thickness of the order of 0.5–1 mm, intended to be contacted by an edge of an original placed on the stage glass 12, so as to position the original at, a regular position. The band member 50 is provided with several marks therealong corresponding to an edge of each of several regular sizes of paper, as shown in FIG. 2.

The construction of the reflection type image reader described above is an example of the conventionally known constructions. In addition to such a known construction, according to the present invention, a fluorescent lamp 52 is provided in the casing 10 to extend in the direction perpendicular to the paper sheet of the drawing over a length corresponding to the length of the stage glass, so as to serve as a light source for the original positioning, and further there is provided a reflecting board 54 to extend over an area corresponding to the entire exposure area of the stage glass, so as to scatter the light beams emitted from the fluorescent lamp 52 toward the stage glass 12. The reflecting board 54 may be made of an aluminum board or the like having a finely roughened surface so that the light beams emitted from the fluorescent lamp 52 are scattered as uniformly toward the stage glass as possible.

Figure 3:
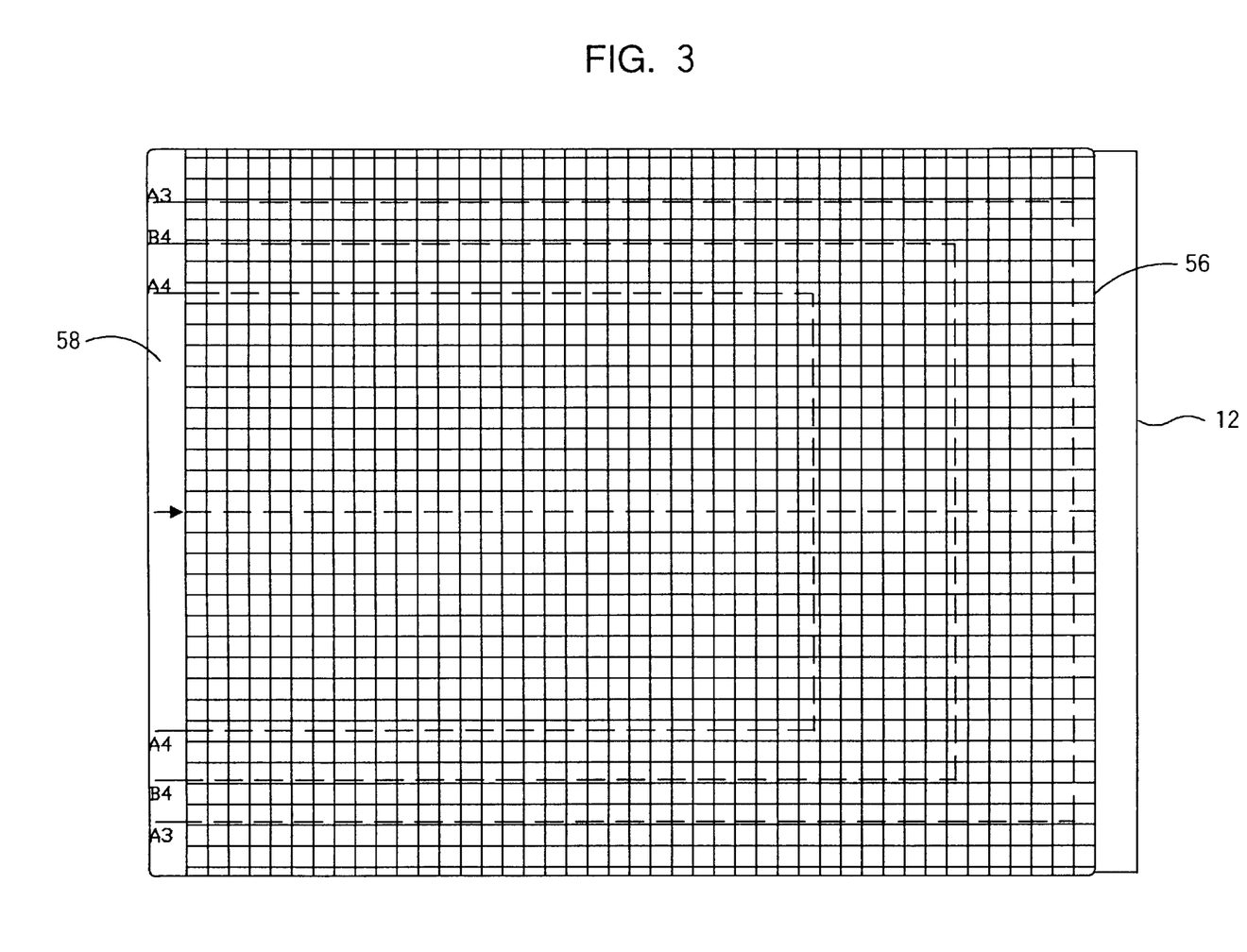
FIG. 3 is a plan view of the original positioning sheet and the stage glass of FIG. 2, showing an embodiment of a further detail of the original positioning reference mark.

Further, according to the present invention, as shown in FIG. 2, an original positioning sheet 56 is mounted to the stage glass 12 to be optionally removable. The original positioning sheet 56 is made of a transparent sheet drawn with a longitudinal/lateral lattice pattern by fine lines as exemplarily shown in the figure, except an edge portion 58 made to be relatively hard and tough along an edge of the rectangular contour thereof, and is adapted to be optionally mounted over the stage glass, with the edge portion 58 being laid over the band member 50 and with a pair of pins 60 projecting therefrom adjacent the opposite ends thereof being engaged into a corresponding pair of pin holes 62 of the band member 50, so as to be in a fixed positional relationship to the stage glass 12. In this connection, the band member 50 may be totally permanently magnetized or may incorporate a permanent, magnet at a portion thereof, while the edge portion 58 may be made of a magnetic material, so that the mounting of the edge portion 58 onto the band member 50 is more stabilized. With the original positioning sheet 56 being mounted onto the stage glass 12 as described above, the original 14 is placed on the stage glass 12 as sandwiched between the stage glass 12 and the original positioning sheet 56. FIG. 3 is a plan view of an example of the original positioning sheet 56 in a state mounted onto the stage glass 12, with an original positioning reference mark based on the longitudinal/lateral lattice pattern by fine lines drawn thereon. In this example, in addition to the lattice mark by fine lines, the contours of the regular paper sizes A4, B4 and A3 are drawn in broken lines.

Figure 4:
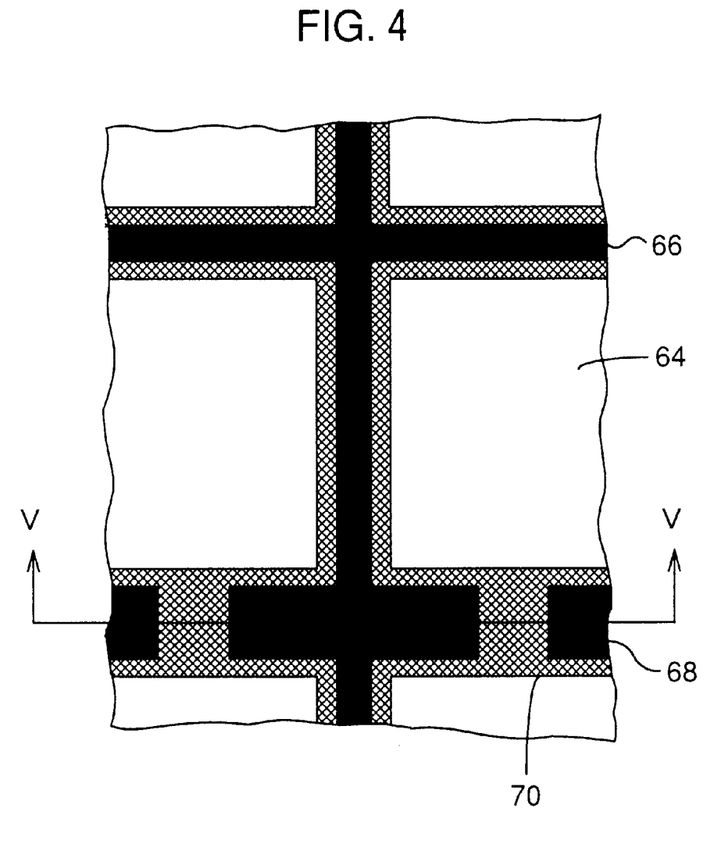
FIG. 4 is a partial plan view showing an embodiment of the detailed construction of the original positioning reference mark of the original positioning sheet of FIG. 3.
Figure 5:
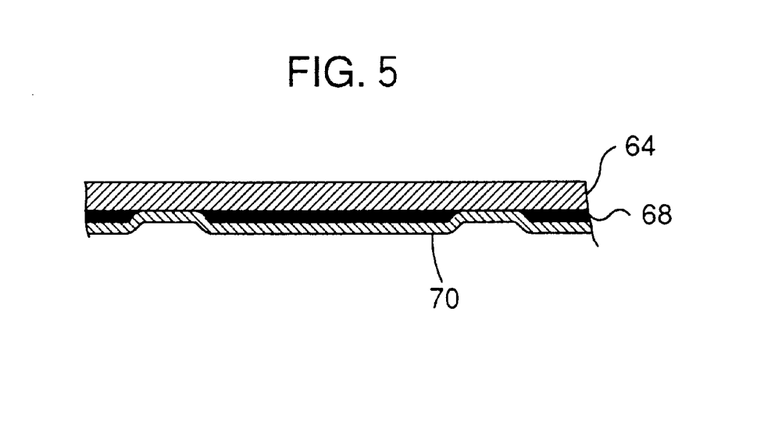
FIG. 5 is a sectional view by line V—V in FIG. 4.

FIGS. 4 and 5 are a plan view and a partial sectional view showing an embodiment of the detailed construction of the original positioning reference mark shown in FIG. 3, respectively, wherein FIG. 5 is a sectional view by line V—V in FIG. 4. In this embodiment, the original positioning sheet 56 has a longitudinal/lateral lattice pattern made of fine lines 66 drawn on the lower surface thereof by an optional color material and broken lines 68 indicating the contours of several regular sizes of paper sheet drawn by the same color material or some other color material, both being clearly observable by human eyes, wherein these lines are covered at the lower surface thereof by a layer 70 of a white color material, particularly a white color of the same tone as the surface of the elastic pad 40 which is generally white, the layer 70 being slightly wider than the lines 66 and 68. Therefore, as viewed from above of the original positioning sheet, the lines 66 and 68 are clearly observed by human eyes, while when the original positioning sheet is viewed from below, the patterns are in the white color.

When an original is positioned on the stage glass 12 relative thereto by using the original positioning sheet of the above-mentioned construction, upon the powering of the fluorescent lamp 52 by a switch button described hereinbelow for emitting light beams to the stage glass from the lower side thereof as reflected on the reflecting board 54, the image of the original by an ordinary paper sheet will be clearly observed from above through the original, so that, when the original is viewed from above through the original positioning sheet laid thereover, any substantial detail of all area of the image will be clearly recognized in relation to the reference mark by the observable lines 66 and 68, except a very small portion of the image covered by the fine linear layer 70.

When the original has been positioned on the stage glass 12 relative thereto such that the image is in a desired positional relationship thereto, leaving the original positioning sheet as it is, the press plate 38 may be laid thereover, and a start button may be pushed to start the reading out operation. For the image reading head 20, the lines 66 and 68 of the original positioning sheet are hidden behind the white layer 70, on the back side of the original, and therefore, the results of the reading out by the image reading head carried out based upon the light beams projected onto and reflected from the front surface of the original will include no phantom of the lines 66 and 68. Further, if the original is made of a transparent or semi-transparent sheet, while the color of the elastic pad 40 of the press plate 38 and that of the white layer 70 are so different from one another that a phantom of the white layer 70 appears in the read out results according to the contrast therebetween, a paper sheet having the same white color as the white layer 70 may be laid over the original positioning sheet, prior to laying the press plate 38 thereover.

As a modification, the reference mark like the longitudinal/lateral lattice pattern provided in the original positioning sheet 56 may be drawn by a fluorescent material or the like observable by human eyes but not responded by the image reading head.

Figure 6:
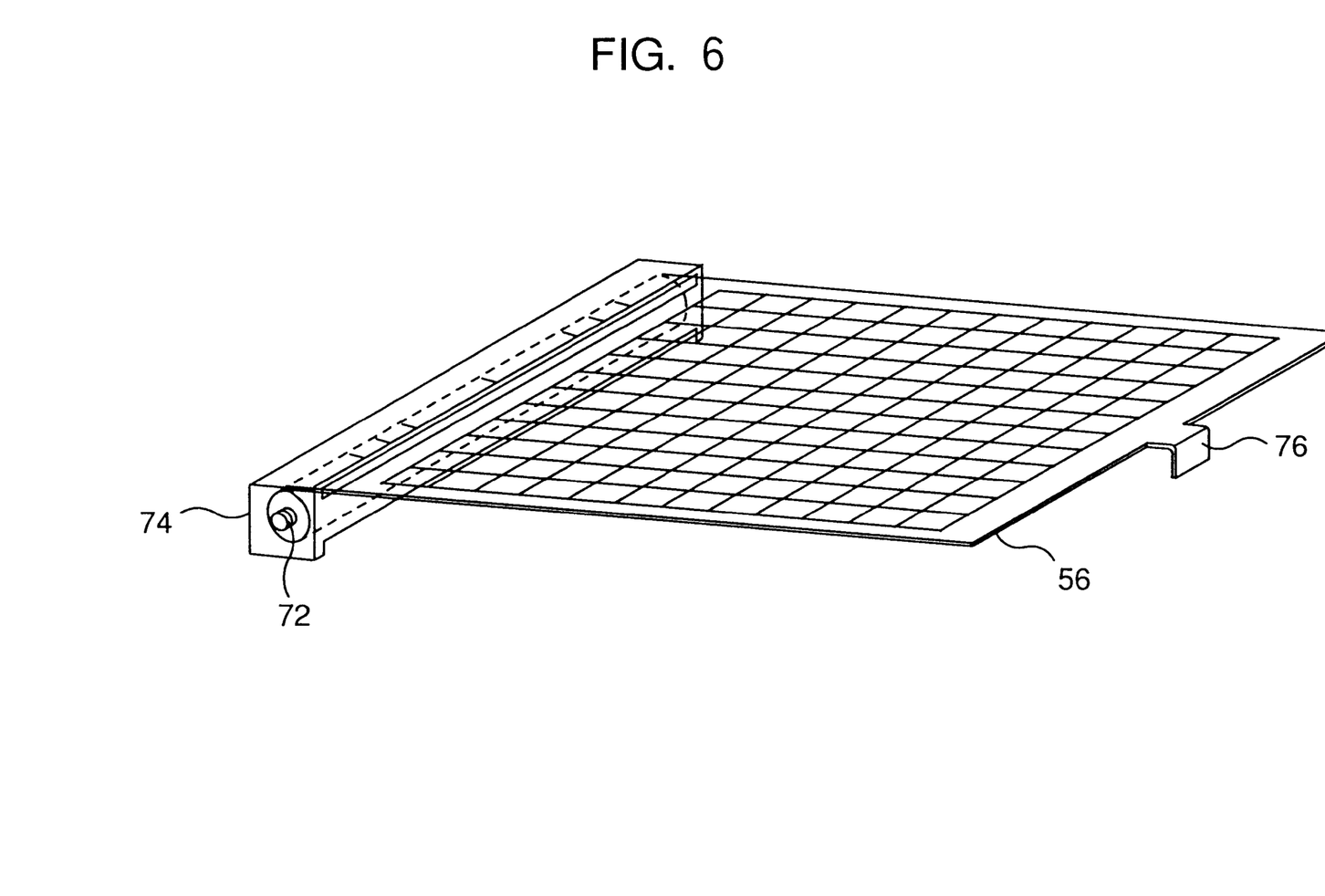
FIG. 6 is a perspective view showing another embodiment of the original. positioning sheet.

Instead of the construction having the edge portion 58 and the pins 60 shown in FIG. 2, the original positioning sheet 56 may have a construction such as shown in FIG. 6, wherein, as well known in the art of pullout type blind or the like, the original positioning sheet is wound around an elongated core rod 72 rotatably mounted to a casing 74 which in turn is mounted to the casing 10 along an edge thereof, the core rod being biased by a helical spring not shown in the figure in the rotational direction of winding up the original positioning sheet therearound, so that the original positioning sheet 56 is unwound from the core rod, when required, to be extended over the stage glass, until a hook portion 76 provided at its forward end is engaged into a corresponding engaging means such as a hole provided at another edge portion of the casing 10.

Figure 7:
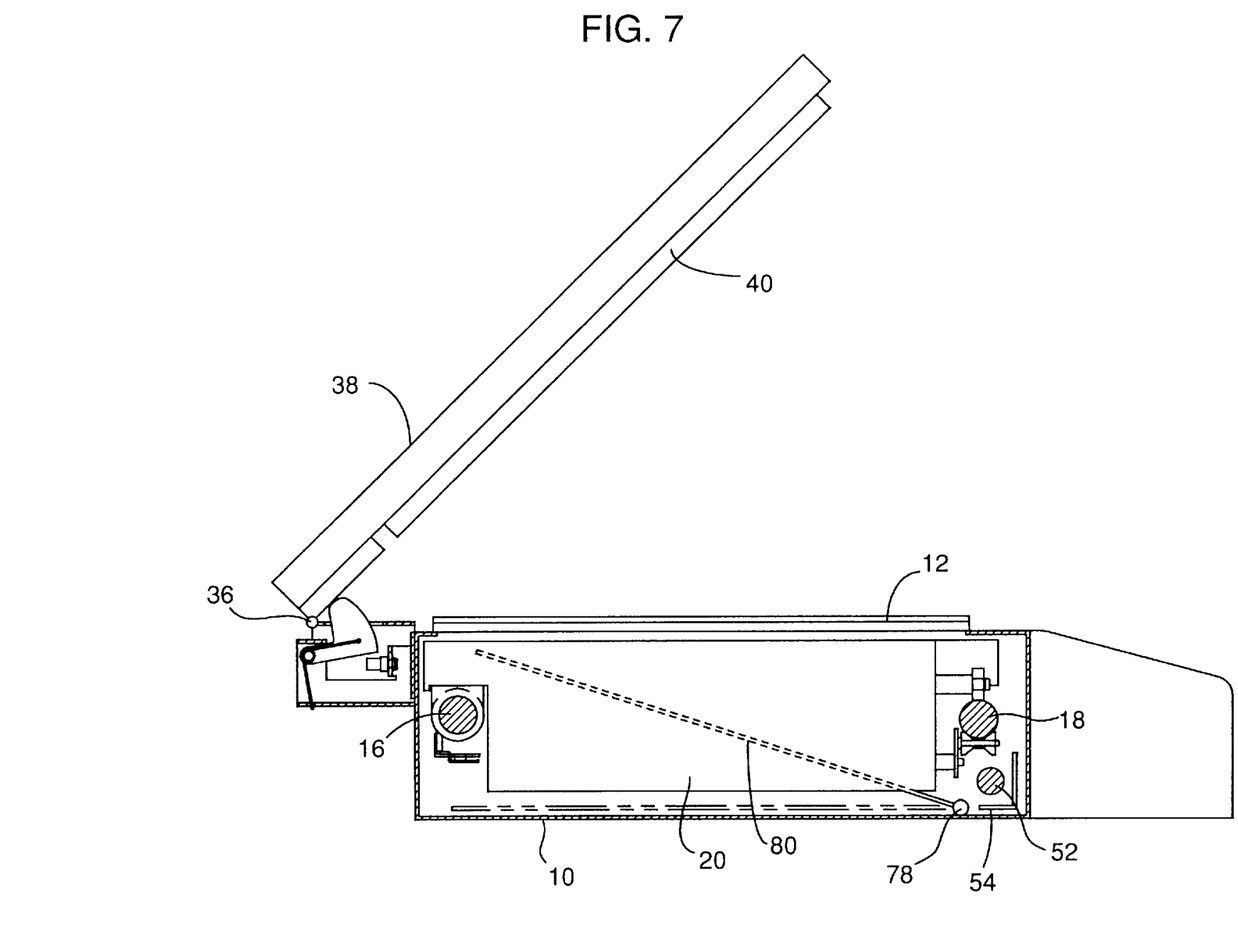
FIG. 7 is a view similar to FIG. 1, showing an image reader incorporatng another embodiment with respect to a part thereof.

FIG. 7 is a view similar to FIG. 1, showing another embodiment of the reflecting board 54 of the embodiment shown in FIG. 1. In FIG. 7, the portions corresponding to those shown in FIG. 1 are designated by the same reference numerals as in FIG. 1. In this embodiment, during the positioning of an original placed on the stage glass 12, the image reading head 20 is in a rest position located along an edge (viewer's side in the figure) of the stage glass, so as to open the space below almost the entire exposure area of the stage glass 12, while the reflecting board 54, formed to be foldable along a hinge portion 78, is inclined at a major portion 80 thereof as shown in the figure along the hinged portion 78 by a drive means not shown in the figure, so that a more uniform projection of the light beams from the fluorescent lamp 52 to the entire exposure area of the stage glass is available. By such an arrangement, in spite of the deviation of the reference mark like the lines 66 and 68 of the original positioning sheet from the image of the original for a distance corresponding to the thickness of the original (more precisely, plus the thickness of the white layer 70), an error in the alignment of the image and the reference mark depending upon an observation of the two in such a spaced overlap relationship is more effectively avoided.

At the rest position, the image reading head 20 is positioned to align with an edge of the exposure area of the stage glass so that it can start the reading out of an original from a first moment of initiation of the scanning movement. In this case, an end region of the exposure area corresponding to the rest position of the image reading head is shaded from the light beams for the original positioning by the image reading head, probably making it difficult to do the original positioning in the end region. In view of this, wherein the original positioning is carried out, the image reading head may be beforehand moved from the rest position in a direction opposite to the original reading direction toward a retreat position to be out of the exposure area of the stage glass, so that the entire region of the exposure area is exposed to the light, beams for the original positioning, as described later.

Figure 8:
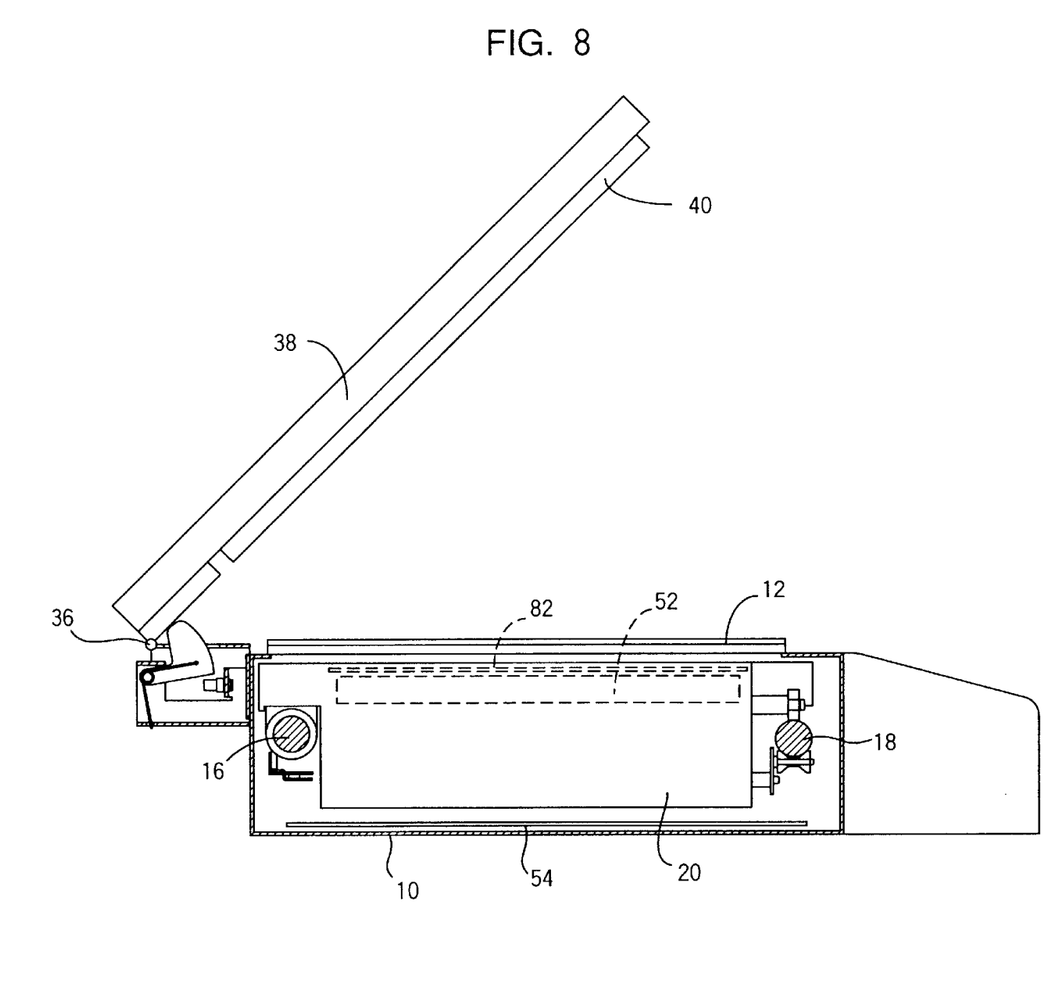
FIG. 8 is a view similar to FIG. 1, showing an image reader incorporating another embodiment with respect to another part thereof.

FIG. 8 is a view similar to FIGS. 1 or 7, showing an embodiment in which the fluorescent lamp 52 serving as a light source for the original positioning is mounted to extend in a direction perpendicular to the direction of scanning of the image reading head 20. Since the light source for the original positioning is operated when the image reading head is positioned at, the above-mentioned rest or retreat position arranged along an edge of the stage glass, the provision of the light source for the original positioning as an elongated lamp mounted at an inside wall portion of the casing or the image reading head 20 to extend in a direction perpendicular to the scanning direction of the image reading head 20 does not interfere with the scanning movement of the image reading head 20. Therefore, by such an arrangement, the fluorescent lamp 52 can be mounted at a relatively high position in the inside space of the casing without interfering with the image reading head 20 and the guide rods 16 and 18, so that, the light, beams projected to the stage glass from the lower side thereof as reflected by the reflecting board 54 are made more uniform and closer to vertical, while a direct lighting of the user's eyes during the original positioning by the fluorescent lamp 52 is more effectively avoided by a provision of an appropriate shade such as a reflecting/shading plate 82 mounted along an upper edge of the fluorescent lamp 52.

Further, instead of providing the fluorescent lamp 52 for the original positioning as in the above-mentioned embodiments, or in addition thereto, the light source means incorporated in the image reading head 20 for the image reading may be use as a light source for the original positioning. However, since the light source means incorporated in the image reading head for the image reading is generally constructed to illuminate a relatively narrow band area at a time, the use of this light source is suited for positioning an original with respect to a fine detail at an optional limited portion thereof.

Figure 9:
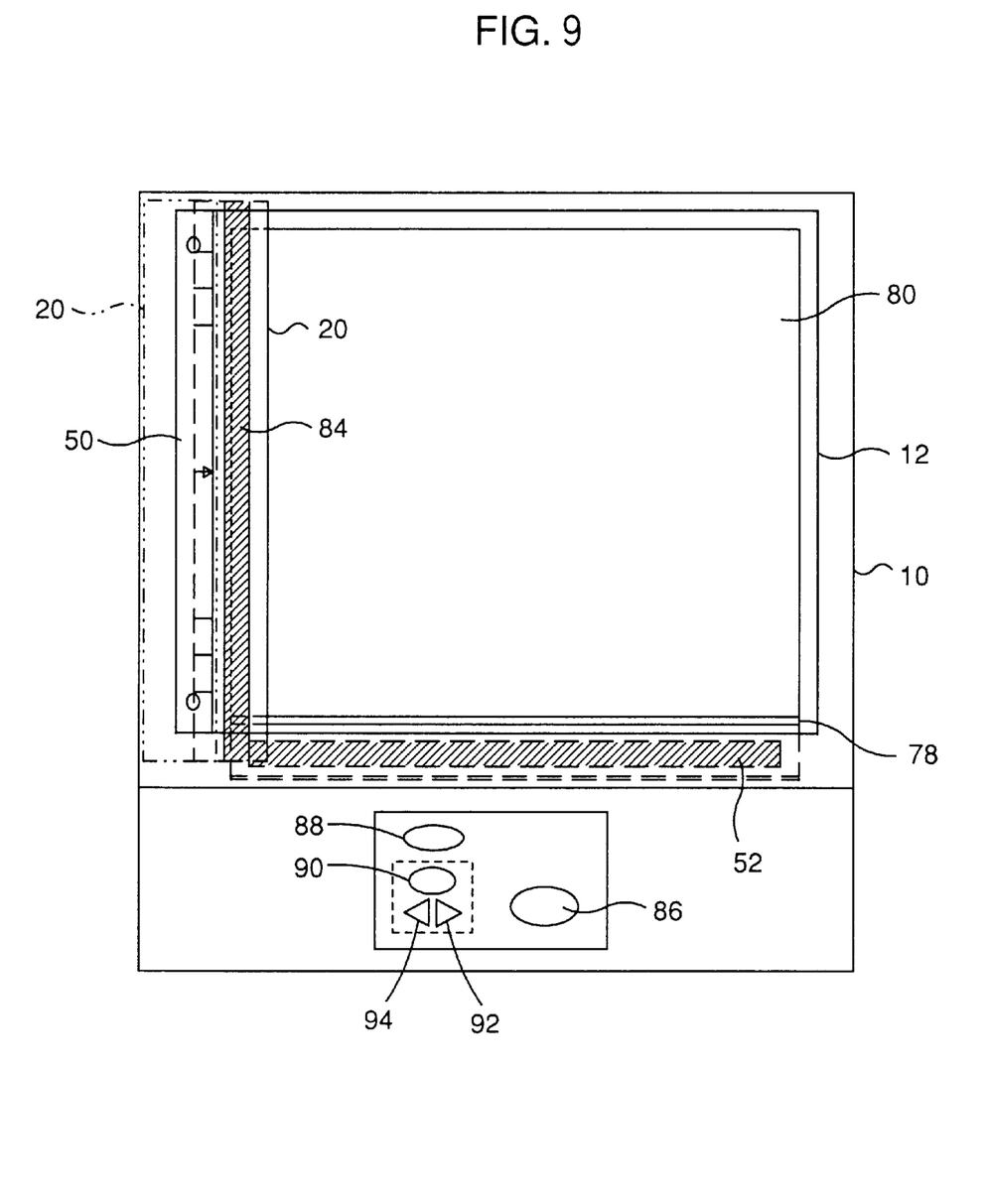
FIG. 9 is a diagrammatical plan view principally showing a part of the control panel of the image reader.

FIG. 9 is a plan view of the body portion of the image reader according to an embodiment in which the major portion 80 of the reflecting board shown in FIG. 7 is constructed to be tiltable about a hinged portion 78 in operation, while the lamp incorporated in the image reading head 20 for the image reading is used for the original positioning, including an embodiment of a control panel of the image reader. In FIG. 9, the portions corresponding to those shown in FIG. 7 are designated by the same reference numerals as in FIG. 7. Further, the stage glass is of the same construction as that shown in FIG. 2. As shown in FIG. 9, the image reading head 20 has a lamp 84 to work as a light source for image reading. As shown in FIG. 9 partly by a solid line, the image reading head 20 is in its rest position, with the lamp 84 being just in alignment with an edge of the exposure area of the stage glass 12, so that, when the image reading is executed, the image reading head 20 is immediately moved from the position shown by the solid line rightward in the figure for an image reading scanning. The two dots dash phantom line in the figure shows the image reading head 20 in its retreat position moved from the rest position in the direction opposite to the scanning direction to be out of the exposure area of the stage glass. When the image reading head is moved to the retreat position, the exposure area of the stage glass can receive the light beams reflected by the major portion 80 of the reflecting board over the entire region thereof, rendering the original positioning to be easily available over the entire region of the exposure area.

In FIG. 9, 86 is an image reading start button for starting the reading out of an original; 88 is a full illumination button to be pushed on when the fluorescent lamp 52 is put on to illuminate the entire exposure area of the stage glass for positioning the original place thereon; 90 is a local illumination button to be pushed on when a stronger illumination is desired at an optional part of the exposure area to do a local positioning of the original by utilizing the lamp 84 intrinsically provided for the image reading; 92 is a right shift button to be pushed on for a desired duration to move the image reading head 20 rightward in the figure in the optional local original positioning; and 94 is a left shift button to be pushed on for a desired duration to move the image reading head 20 leftward in the figure in the optional local original positioning. In this connection, the full illumination button 88 and the local illumination button 90 are each of the conventionally known type which alternately changes between off and off each time when it is pushed on, so as to turn on the lamp when it is in the on state.

Figure 10A:
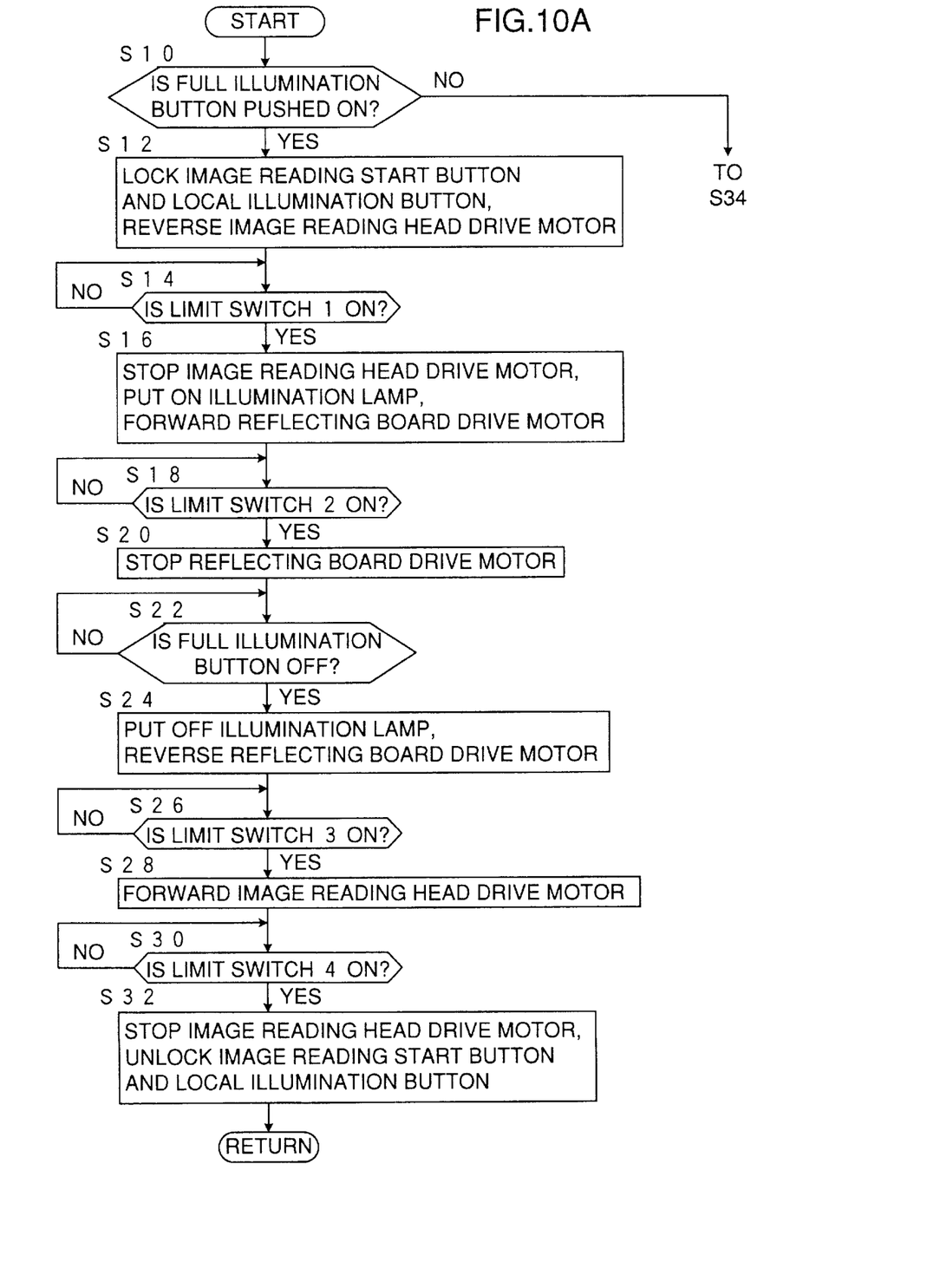
FIG. 10A is a part of a flowchart showing an embodiment of the operation of the image reader.
Figure 10B:
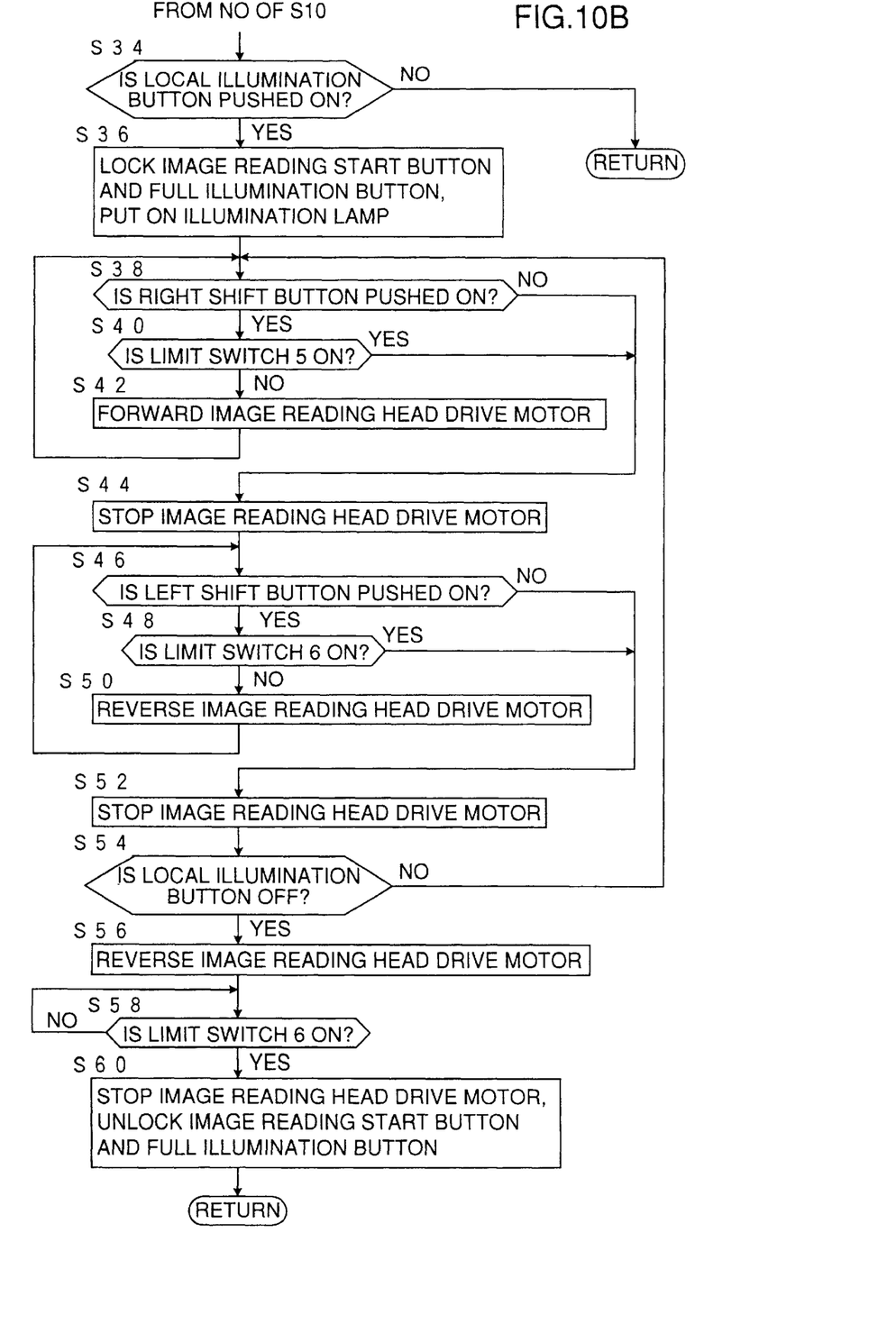
FIG. 10B is another part of the flowchart to follow the part thereof shown in FIG. 10A.

In the following, the operation of the embodiment, shown in FIG. 9 will be described with reference to FIGS. 10A and 10B, wherein FIG. 10B is to be viewed as connected to the "no" branch of step 10 of FIG. 10A. The control operation through each step of the flowchart shown in these figures is executed by an automatic control means in the form of a microcomputer (not shown) incorporated in the image reader, so as to be repetitively carried out at a cycle time such as several tens of microsecond while a power switch (not shown) thereof is made on.

When the control according to this flowchart is started, first in step 10, it is checked if the full illumination button 88 is pushed on or not. If the answer is yes, the control proceeds to step 12, wherein the image reading start button 86 and the local illumination button 90 are locked not to operate, and a motor (not shown) for driving the image reading head 20 for the scanning operation along the guide rods 16 and 18 is operated in a reversed direction so that the image reading head 20 is moved leftward in FIG. 9 from the position therein shown. Then, in step 14, it is checked if the image reading head 20 has reached the retreat position shown by the two dots dash phantom line in FIG. 9 according to if a limit switch 1 (not, shown) adapted to be made on upon detection thereof is on or not. If the answer is no, the control returns to step 12. repeating this cycle until the limit switch 1 is turned on.

When the limit switch 1 was turned on, the control proceeds to step 16, wherein the image reading head drive motor is stopped, the fluorescent lamp 52 is put on, and a motor (not shown) for the reflecting board is started in a normal direction of operation, so as to move the major portion 80 of the reflecting board from its horizontal position toward its inclined position such as shown in FIG. 7. In step 18, it is checked if a limit switch 2 (not shown) adapted to be made on when the major portion 80 reaches the inclined position. If the answer is no, the control returns to step 18, repeating this cycle until the limit switch 2 is turned on.

When the limit, switch 2 was turned on, the control proceeds to step 20, wherein the reflecting board drive motor is stopped. In this state, the entire region of the exposure area of the stage glass is illuminated by the fluorescent lamp 52, with the major portion 80 of the reflecting board being held inclined. When the original positioning sheet 56 shown in FIGS. 2 or 6 is mounted onto the stage glass 12 in this state, an original placed on the stage glass is readily positioned in the manner described above. This state is maintained until the original positioning is finished and the entire illumination button 88 is pushed on again to put it off.

When the entire illumination button 88 was put off, the control proceeds to step 24, wherein the fluorescent lamp 52 is put off, and the reflecting board driving motor is operated in a reversed direction, so that the major portion 80 of the reflecting board is returned from the inclined position shown in FIG. 7 to the horizontal position shown by the two dots and dash line in FIG. 7. Then, in step 26, it is checked if a limit switch 3 (not shown) adapted to be put on upon detecting the return of the major portion 80 to the horizontal position is on or not. Until the major portion 80 is returned to the horizontal position, the control cycles through step 26. When the answer of step 26 turned to yes, the control proceeds to step 28, wherein the image reading head drive motor is started in the normal direction of rotation, so that the image reading head positioned in the retreat position shown by the two clots lash line in FIG. FIG. 9 is move rightward in the figure toward the rest position shown by the solid line in FIG. 9. Until the image reading head reaches the rest position so that a limit switch 4 (not, shown) provided therefor is put on, the control cycles through step 30.

When the image reading head 20 reached the rest position so that the limit switch 4 is turned on, the control proceeds to step 32, and the image reading head drive motor is stopped, while the locking of the image reading start button 86 and the local illumination button 88 is dissolved, with the image reader being prepared ready to start the image reading any time when the image reading start button 86 is pushed on.

When the answer of step 10 is no, i.e. when the full illumination button 88 is not pushed on, the control proceeds to step 34, it is checked if the local illumination button 90 for operating the lamp 84 of the image reading head 20 for a local original positioning is pushed on or not. If the answer is yes, the control proceeds to step 36, wherein the image reading start button 86 and the full illumination button 88 are locked, while the lamp 84 is put oil.

Then the control proceeds to step 38, and it is checked if the right shift button 92 is pushed on or not. If the answer is yes, the control proceeds to step 40, wherein it is checked if a limit switch 5 (not shown) adapted to be put on upon detecting that the image reading head 20 has reached the final position of the scanning stroke toward right in FIG. 9. When the answer is no, the control proceeds to step 42, wherein the image reading head drive motor is operated in the normal direction of rotation, so as to move the image reading head 20 rightward in FIG. 9 along the scanning route. The control returns from step 42 to step 38, so as to continue the normal rotation of the image reading head drive motor as long as the right shift button is pushed on, while the limit switch 5 is not turned on.

When the pushing on of the right shift button 92 was ended, or the image reading head 20 reached the final position of the rightward scanning movement so that the limit switch 5 is turned on, the control proceeds to step 44, wherein the operation of the image reading head drive motor is stopped. Then the control proceeds to step 46, wherein it is checked if the left shift button 94 is pushed on or not. If the left shift button is pushed on, the control proceeds to step 48, wherein it is checked if a limit switch 6 (not shown) adapted to be put on upon detecting that the image reading head 20 has reached the final position of the scanning stroke toward left in FIG. 9. When tile answer of step 48 is no, the control proceeds to step 50, wherein the image reading head drive motor is operated in the reversed direction of rotation, so as to move the image reading head 20 leftward in FIG. 9 along the scanning route. The reversed rotation of the image reading head drive motor is continued as long as the left shift button is pushed on, while the limit switch 6 is not turned on.

When it was checked in step 46 or 48 that the left shift, button was no longer pushed on or the limit switch 6 was turn on, the control proceeds to step 52, wherein the image reading head drive motor is stopped. Then in step 54, it is checked if the local illumination button is made off by being pushed on again or not. When the answer is yes, the control proceeds to step 56, wherein the image reading head drive motor is operated in the reversed direction of rotation, so that the image reading head is returned to the rest position. Then in step 58, it is checked if the above-mentioned limit switch 6 is on, i.e. the image reading head 20 has reached the rest position, or not. When the answer is turned to yes, the control proceeds to step 60, wherein the image reading head drive motor is stopped, while the locking of the image reading start button 86 and the full illumination button 88 is dissolved.

When the answer of step 54 is no, the control returns to step 38, so that the further steps are repeated. Therefore, when the local illumination button is pushed on, the image reading head 20 is optionally moved to rightward or leftward in FIG. 9 by optionally pushing on the right shift button 92 or the left shift button 94, while the lamp 84 is being put on in the meantime.

When the answer of step 34 is no, the control according to FIGS. 10A and 10B is immediately ended, and the control is restarted from step 10.

In the embodiment shown in FIGS. 10A and 10B, the fluorescent lamp 52 for illuminating the entire region of the exposure area of the stage glass and the lamp 84 for illuminating an optional band area of the stage glass are adapted to be alternatively put on, because the major portion 80 of the reflecting board is raised to incline as shown in FIG. 7, so as to interfere with the movement of the image reading head along the scanning route, when the fluorescent lamp 52 is put on. When the reflecting board is not of such a movable type the construction may be such that those two light means are operated at, the same time. Further, as a matter of course and as already described, the image reader may have only one of those two illumination means. Further, although the image reading head 20 is moved from the rest position to the retreat position adjacent thereto by the reversed rotation of the image reading head drive motor in the embodiment described with reference to FIGS. 9–11, the image reading head may be move to a rest, position provided on the other side of the stage glass once across the stage glass by the rotation of the image reading head drive motor in the normal direction, according to a convenience of the overall design of the image reader.

Although the present invention has been described in detail with respect to some embodiments thereof, it will be apparent for those skilled in the art that various other embodiments and modifications of the shown embodiments are possible within the scope of the present invention.

What is claimed is:

1. An image reader comprising a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a first light source means for projecting light beams to the original placed on the stage glass from a lower side thereof therethrough and a photoelectric converting means for receiving and converting light beams reflected from the original into an electric signal corresponding to the image, a substantially transparent original positioning sheet optionally mounted over the stage glass in a predetermined positional relationship thereto, the original positioning sheet bearing an original positioning reference mark made of a fine line drawn in a color observable by human eyes from an upper side of the original positioning sheet, with a band layer of a white painting material provided to extend along the color line on a lower side thereof so as to be slightly wider than the color line to cover the color line against the photoelectric converting means, and a second light source means for projecting light beams to the original placed on the stage glass from the lower side thereof therethrough and the original positioning sheet placed thereon when the original is placed between the stage glass and the original positioning sheet mounted thereover.

2. An image reader according to claim 1, wherein the original positioning reference mark is drawn by a fluorescent material observable by human eves but not detectable by the photoelectric image reading head.

3. An image reader according to claim 1, wherein the stage glass and the original positioning sheet are each of a rectangular contour, and the original positioning sheet is removably mounted at a portion thereof extending along an edge of the rectangular contour thereof to either the stage glass or the casing along an edge of the rectangular contour of the stage glass.

4. An image reader according to claim 1, wherein the stage glass and the original positioning sheet are each of a rectangular contour, and the original positioning sheet is wound up about a core rod arranged along an edge of the rectangular contour of the stage glass in parallel thereto in a housed condition thereof and is unwound therefrom to extend over the stage glass when used.

5. An image reader according to claim 1, wherein the photoelectric image reading head is of a scanning type to move along the stage glass therebelow in reading out the image of the original, and it is when the image reading head is at a rest position of a scanning movement thereof that the second light, source means is powered to emit the light beams, with a reflecting board for reflecting the light beams from the second light source means toward an exposure area of the stage glass.

6. An image reader according to claim 5, wherein the reflecting board is a plane board having a surface which scatters light beams, the reflecting board being positioned at a bottom portion of an inner space of the casing to oppose the stage glass, with the light beams emitted from the second light source means being projected toward the surface of the reflecting board.

7. An image reader according to claim 6, wherein the reflecting board is of a movable type adapted to be positioned at a retreat position thereof not to interfere with the scanning movement of the image reading head when the image reading head is scanning, and biased from the retreat position so as to more uniformly reflect the light beams from the second light, source means when the image reading head is at the rest or retreat position.

8. An image reader according to claim 1, wherein the photoelectric image reading head is of a scanning type to move along the stage glass therebelow in reading out the image of the original, the image reading head being movable to a retreat position from a rest position of a scanning movement thereof to be out of an exposure area of the stage glass, and it, is when the image reading head is at the retreat position that the second light source means is powered to emit the light beams, with a reflecting board for reflecting the light beams from the second light source means toward the exposure area of the stage glass.

9. An image reader according to claim 1, wherein the second light source means includes an elongated lamp extending in a direction perpendicular to a direction of scanning movement of the image reading head.

10. An image reader according to claim 1, wherein the second light source means is provided by a lamp of the first light source means being controlled of lightening thereof in a manner different, from a manner of the lamp being controlled for providing the first light source means, and the image reading head is movable to and stopped at any optional position of a scanning movement thereof according to a manual control, with the lamp being so controlled as to provide the second light source means.

11. An image reader according to claim 1, wherein the color line is provided on a lower surface of the original positioning sheet, the color line being sandwiched between the original positioning sheet and the band layer of the white painting material.

12. An image reader, comprising a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a first light source means for projecting light beams to the original placed on the stage glass from a lower side thereof therethrough and a photoelectric converting means for receiving and converting light beams reflected from the original into an electric signal corresponding to the image, a substantially transparent original positioning sheet optionally mounted over the stage glass in a predetermined positional relationship thereto, the original positioning sheet bearing an original positioning reference mark made of a fine line drawn in a color observable by human eyes from an upper side of the original positioning sheet, with a band layer of a white painting material provided to extend along the color line on a lower side thereof so as to cover the color line against the photoelectric converting means, and a second light source means for projecting light beams to the original placed on the stage glass from the lower side thereof therethrough and the original positioning sheet placed thereon when the original is placed between the stage glass and the original positioning sheet mounted thereover, wherein the stage glass and the original positioning sheet are each of a rectangular contour, and the original positioning sheet is wound up about a core rod arranged along an edge of the rectangular contour of the stage glass in parallel thereto in a housed condition thereof and is unwound therefrom to extend over the stage glass when used.

13. An image reader, comprising a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a first light source means for projecting light beams to the original placed on the stage glass from a lower side thereof therethrough and a photoelectric converting means for receiving and converting light beams reflected from the original into an electric signal corresponding to the image, a substantially transparent original positioning sheet optionally mounted over the stage glass in a predetermined positional relationship thereto, the original positioning sheet bearing an original positioning reference mark made of a fine line drawn in a color observable by human eyes from an upper side of the original positioning sheet, with a band layer of a white painting material provided to extend along the color line on a lower side thereof so as to cover the color line against the photoelectric converting means, and a second light source means for projecting light beams to the original placed on the stage glass from the lower side thereof therethrough and the original positioning sheet placed thereon when the original is placed between the stage glass and the original positioning sheet mounted thereover, wherein the photoelectric image reading head is of a scanning type to move along the stage glass therebelow in reading out the image of the original, and it is when the image reading head is at a rest position of a scanning movement thereof that the second light source means is powered to emit the light beams, with a reflecting board for reflecting the light beams from the second light source means toward an exposure area of the stage glass, the reflecting board is a plane board having a surface which scatters light beams, the reflecting board being positioned at a bottom portion of an inner space of the casing to oppose the stage glass, with the light beams emitted from the second light source means being projected toward the surface of the reflecting board, and the reflecting board is of a movable type adapted to be positioned at a retreat position thereof not to interfere with the scanning movement of the image reading head when the image reading head is scanning, and biased from the retreat position so as to more uniformly reflect the light beams from the second light source means when the image reading head is at the rest or retreat position.

14. An image reader, comprising a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a first light source means for projecting light beams to the original placed on the stage glass from a lower side thereof therethrough and a photoelectric converting means for receiving and converting light beams reflected from the original into an electric signal corresponding to the image, a substantially transparent original positioning sheet optionally mounted over the stage glass in a predetermined positional relationship thereto, the original positioning sheet bearing an original positioning reference mark made of a fine line drawn in a color observable by human eyes from an upper side of the original positioning sheet, with a band layer of a white painting material provided to extend along the color line on a lower side thereof so as to cover the color line against the photoelectric converting means, and a second light source means for projecting light beams to the original placed on the stage glass from the lower side thereof therethrough and the original positioning sheet placed thereon when the original is placed between the stage glass and the original positioning sheet mounted thereover, wherein the second light source means is provided by a lamp of the first light source means being controlled of lightening thereof in a manner different from a manner of the lamp being controlled for providing the first light source means, and the image reading head is movable to and stopped at any optional position of a scanning movement thereof according to a manual control, with the lamp being so controlled as to provide the second light source means.

15. An image reader, comprising a casing, a stage glass mounted to the casing for supporting an original bearing an image to be read out thereon with the image facing downward, a press plate adapted to be optionally laid over the stage glass for pressing the original placed on the stage glass thereto, a photoelectric image reading head having a first light source means for projecting light beams to the original placed on the stage glass from a lower side thereof therethrough and a photoelectric converting means for receiving and converting light beams reflected from the original into an electric signal corresponding to the image, a substantially transparent original positioning sheet optionally mounted over the stage glass in a predetermined positional relationship thereto, the original positioning sheet bearing an original positioning reference mark made of a fine line drawn in a color observable by human eyes from an upper side of the original positioning sheet, with a band layer of a white painting material provided to extend along the color line on a lower side thereof so as to cover the color line against the photoelectric converting means, and a second light source means for projecting light beams to the original placed on the stage glass from the lower side thereof therethrough and the original positioning sheet placed thereon when the original is placed between the stage glass and the original positioning sheet mounted thereover, wherein the color line is provided on a lower surface of the original positioning sheet, the color line being sandwiched between the original positioning sheet and the band layer of the white painting material.

* * * * *